United States Patent [19]

Gamba

[11] Patent Number: 4,609,981
[45] Date of Patent: Sep. 2, 1986

[54] DIRECT CURRENT CONVERTER FOR SWITCHED MODE POWER SUPPLY

[75] Inventor: Piero Gamba, Strambino, Italy

[73] Assignee: Ing. C. Olivetti & C., S.p.A., Ivrea, Italy

[21] Appl. No.: 629,628

[22] Filed: Jul. 11, 1984

[30] Foreign Application Priority Data

Jul. 11, 1983 [IT] Italy .................. 67749 A/83

[51] Int. Cl.[4] .......................... H02M 3/335
[52] U.S. Cl. .................. 363/22; 331/113 A; 363/20
[58] Field of Search .......... 363/22, 23, 49, 56, 363/97, 131, 132, 133, 16, 19, 20; 331/112 R, 113 A

[56] References Cited

U.S. PATENT DOCUMENTS

| | | | |
|---|---|---|---|
| 3,539,905 | 11/1970 | Schwarz | 363/133 |
| 3,596,165 | 7/1971 | Andrews | 363/19 |
| 4,158,881 | 6/1979 | Simmons et al. | 363/97 |
| 4,334,267 | 6/1982 | Miko | 363/22 |
| 4,424,556 | 1/1984 | Maeda et al. | 363/22 |

FOREIGN PATENT DOCUMENTS 892614  12/1981  U.S.S.R. ................ 363/20

OTHER PUBLICATIONS

Slack, "Design of Single-Ended DC-DC Converters", Proc. Powercon 2, Oct. 1975, pp. 18–23.

Primary Examiner—Patrick R. Salce
Assistant Examiner—D. L. Rebsch
Attorney, Agent, or Firm—Banner, Birch, McKie & Beckett

[57] ABSTRACT

The converter comprises an output transformer (T1) through which pass trapezoidal current waves. The primary winding (A0) is supplied under the control of two control circuits (P1, P2), each comprising a transistor (Q1, Q2) and a diode (D1, D2) which are connected in anti-parallel. The two transistors are controlled by two oppositely-poled secondary windings (W1, W2) of a second transformer (T2), the primary winding (W3) of which is controlled by the first transformer (T1). Associated with each control circuit (P1, P2) is a capacitor (C1, C2) such as to accumulate energy during one phase of operation and to discharge it during a subsequent phase. Another winding (Wc) of the second transformer (T2) permits the latter to be biased, stabilizing the output voltages by means of closed-loop feedback control of one thereof.

5 Claims, 8 Drawing Figures

4,609,981

DIRECT CURRENT CONVERTER FOR SWITCHED MODE POWER SUPPLY

BACKGROUND OF THE INVENTION

The present invention relates to a direct current converter for a switched mode stabilized power supply, wherein at least one output voltage is obtained in a secondary circuit of a transformer through which trapezoidal current waves pass, the primary winding of the transformer being supplied with a high voltage by way of a pair of control circuits each comprising a transistor and a diode which are connected in anti-parallel.

In known converters of the above-indicated type, the transistors are controlled by means of electronic control circuits which make the converters rather complicated and expensive.

SUMMARY OF THE INVENTION

The object of the present invention is to provide a converter which does not require such control circuits and which is of a very simple design.

Accordingly, the converter according to the invention is characterized in that the transistors are controlled by two opposite-poled secondary windings of a second transformer, the primary of which is controlled by the first transformer, whereby control of the transistors is effected by a magnetic circuit.

BRIEF DESCRIPTION OF THE DRAWINGS

The invention will now be described, by way of example, with reference to the accompanying drawings, in which.

DESCRIPTION OF THE PREFERRED EMBODIMENTS

Figure 2:
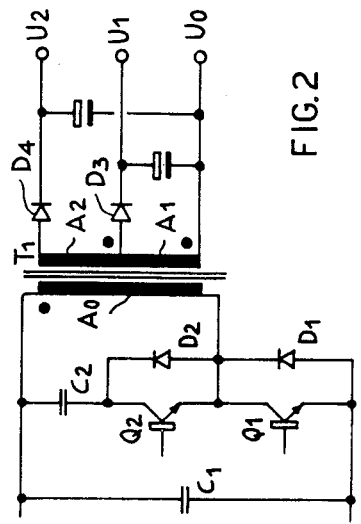
FIGS. 2 and 3 show two alternative forms of the outputs of the converter shown in FIG. 1.
Figure 3:
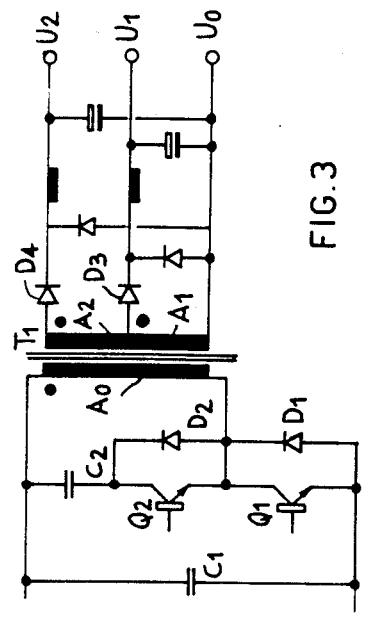
Figure 1:
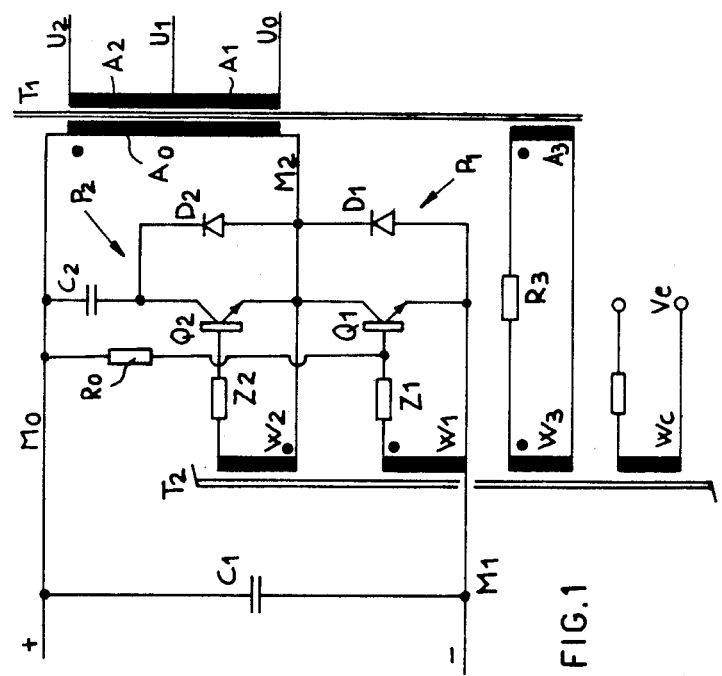
FIG. 1 is a circuit diagram of a direct current converter according to the invention.

The direct current converter for a switched mode power supply comprises a first transformer T1 whose secondary comprises a series of windings A1, A2 which supply various voltages at a series of output terminals U1, U2, with referenced to a terminal U0, for example, supplying an assembly of electronic circuits. As will be seen later in connection with FIGS. 2 and 3, the secondary windings A1, A2 are arranged for supplying output voltages during one of a pair of operating phases of the transformer T1. The transformer T1 further comprises a primary winding A0 which is supplied by means of two conductors M0 and M1 energized at high voltage, which voltage is produced by a rectifier circuit in a known manner, not described herein. The conductor M0 is connected to one end of the winding A0.

The opposite end of the primary winding A0 is connected to two control circuits P1 and P2, each of which comprises a transistor Q1 and Q2 and a diode D1 and D2 connected to the respective transistor in anti-parallel, i.e. the forward directions of the diode and the transistor are opposite. In addition, the two transistors Q1 and Q2 are connected in series with each other and the two diodes D1 and D2 are connected in series with each other, while the said opposite end of the primary winding A0 is connected by means of a conductor M2 to the junction between the two transistors Q1 and Q2 and the two diodes D1 and D2. The two transistors Q1 and Q2 are controlled at their bases by respective secondary windings W1 and W2 of a second transformer T2. The two windings W1 and W2 are oppositely poled and are connected at one end to their transistors by way of impedances Z1 and Z2 respectively. The opposite end of the winding W1 is connected to the second supply conductor M1 from the rectifier circuit while the opposite end of the winding W2 is connected to the conductor M2.

The primary of the transformer T2 comprises a winding W3 which is connected by way of a resistor R3 to a winding A3 of the transformer T1, whereby a signal corresponding to the voltage waves produced by the transformer T1 at the outputs U1 and U2 is fed back to the primary of the transformer T2.

Associated with each control circuit P1 and P2 is a respective capacitor C1 and C2 which is capable of accumulating energy in one phase of operation and restoring it in a subsequent phase. In particular, the capacitor C1 is connected between the conductor M0 and the conductor M1 and thus the emitter of the transistor Q1, while the capacitor C2 is connected between the conductor M0 and the collector of the transistor Q2. A resistor R0 between the conductor M0 and the base of the transistor $Q_1$ serves for starting the converter.

Figure 5:
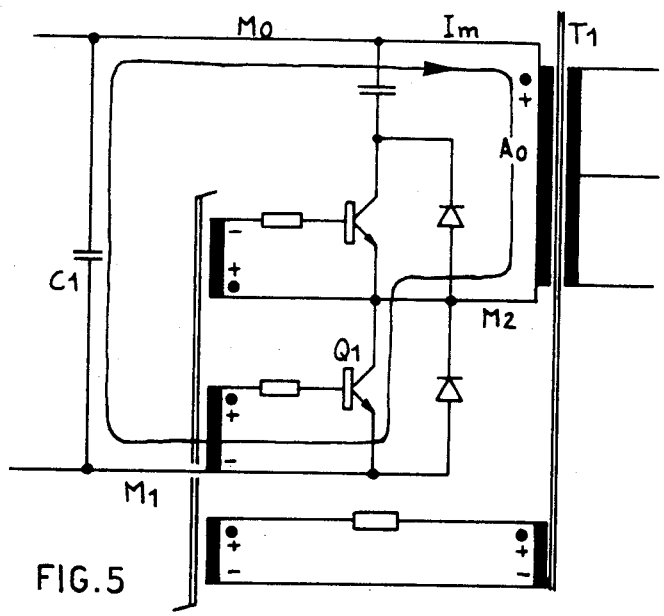
FIGS. 5 to 8 show four different phases in operation of the converter.

When the rectifier circuit is energized, at the beginning, the supply current therefrom passes through the resistor R0 and excites the transistor Q1. Consequently, the current flowing through the transistor Q1 also passes through the primary A0 of the transformer T1 magnetizing transformer T1 during a first operating phase of the transformer. The latter, by way of the winding A3, excites the winding W3, thereby also magnetizing the transformer T2. The winding W1 now provides control for the base of the transistor Q1 which remains conductive, whereby the current Im in the winding A0 goes from the collector to the emitter of the transistor Q1 (see FIG. 5) and partially discharges the capacitor C1. The winding W2 meanwhile holds the transistor Q2 in an off condition.

Figure 6:
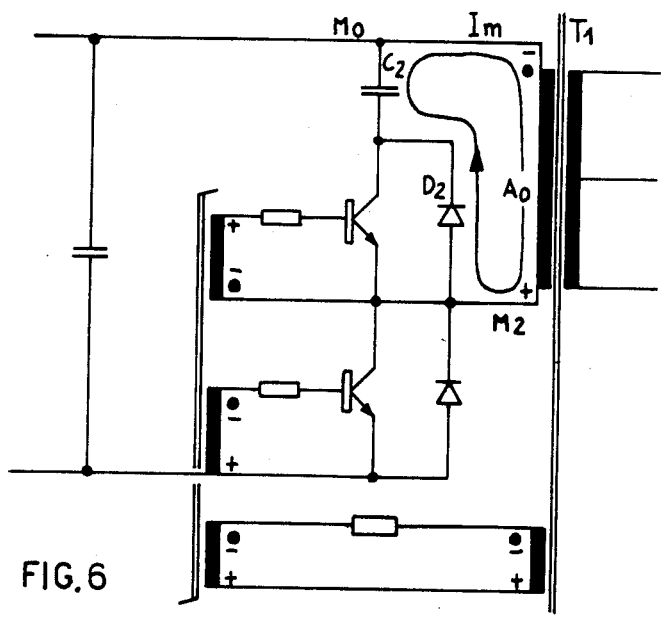

When the transformer T2 reaches saturation, the current in the winding W1 ceases, whereby the transistor Q1 ceases to conduct whereby a second operating phase of the transformer T1 is started. The magnetizing current Im is now forced to pass through the diode D2 and to charge the capacitor C2 (see FIG. 6). In this phase therefore the voltage generated at the primary winding A0 is inverted, whereby the voltages of the winding A3 and of the windings W1, W2 and W3 are also inverted.

Figure 7:
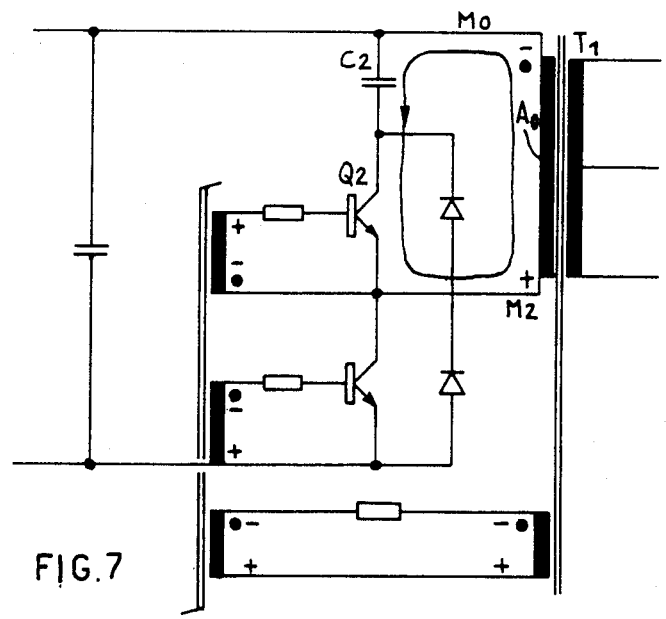

The winding W2 now provides for control of the base of the transistor Q2 which is switched on. When the current which passes through the winding A0 of the transformer T1 goes to zero, the capacitor C2 begins to discharge to the transformer T1 by way of the transistor Q2 which is already switched on, thus reversing the direction of the current Im, as indicated in FIG. 7 to demagnetize the transformer T1. That condition continues until the transformer T2 then reaches a condition of saturation, the transistor Q2 then losing its turn-on control.

Figure 8:
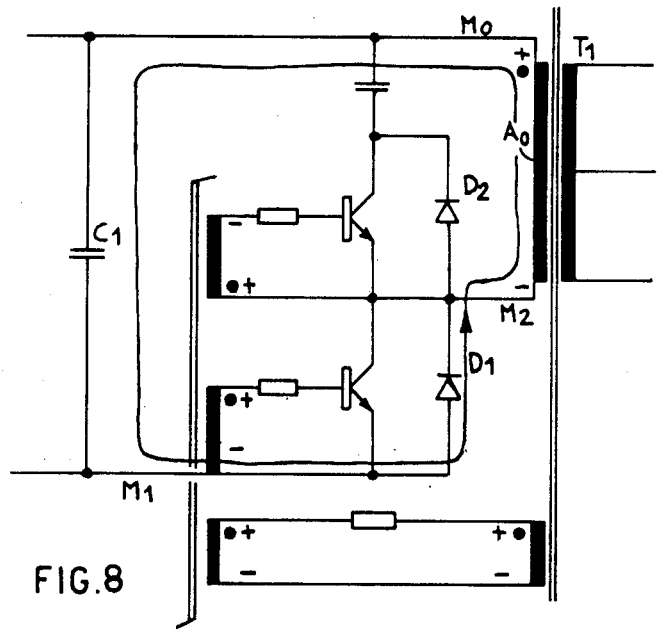

The fact that the transistor Q2 is switched off forces the magnetizing current Im to pass through the diode D1 (see FIG. 8), charging the capacitor C1. The voltage at the transformer T1 is now again such as to provide control for the transistor Q1 which in the way is ready to re-magnetize the transformer T2 as soon as the current Im goes to zero, whereby the cycle is repeated.

It will be clear therefore that the above-described converter is self-oscillating without the need for electronic control circuits, making it possible to recycle the energy which is dispersed between the primary and secondary circuits of the transformer T1, thereby guaranteeing an increase in output and efficiency and a voltage at the transistors Q1 and Q2 which is closely controlled and clearly defined.

Figure 4:
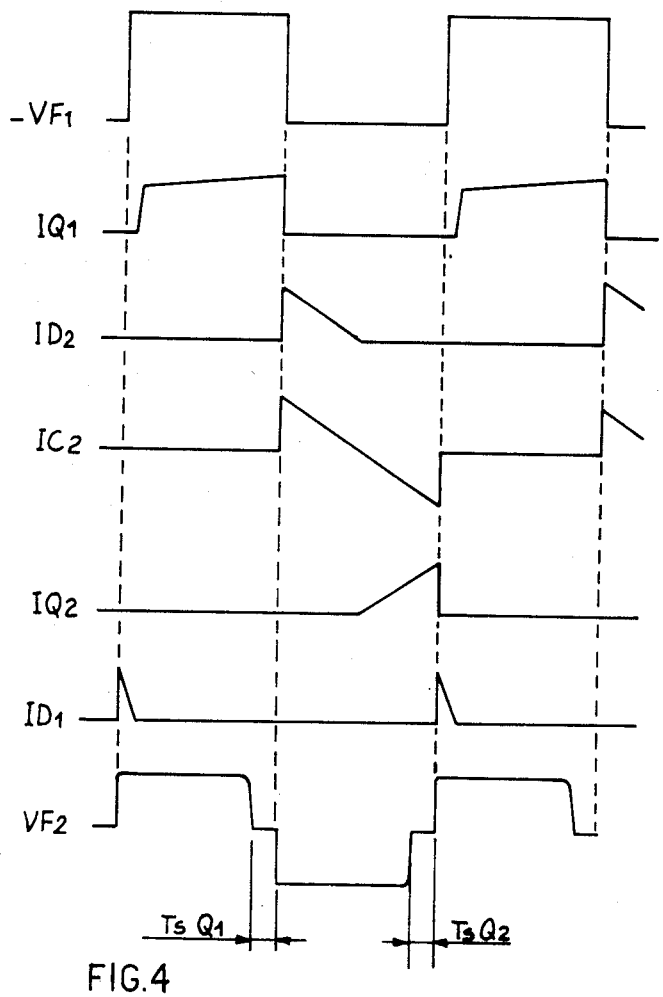
FIG. 4 is a diagram showing the voltage and current waveforms in the various components of the converter.

In FIG. 4, the waveform -VF1 shows the voltage to transformer T1 which provides for control of the transistors Q1 and Q2. The waveform IQ1 indicates the current flowing through the transistor Q1, which discharges the capacitor C1 in the phase shown in FIG. 5. The waveform ID2 shows the current which flows through the diode D2, going on to charge the capacitor C2 in the phase shown in FIG. 6. The waveform IC2 indicates the complete waveform of the current in the capacitor C2 also in the phase shown in FIG. 7 while the waveform IQ2 indicates the current flowing through the transistor Q2 in the same phase. The waveform ID1 shows the rapid reversal in the direction of current in the winding A0 by way of the diode D1 in the phase shown in FIG. 8. Finally, the waveform VF2 shows the voltage in the transformer T2, which effects control of the transistors Q1 and Q2. The falling edge of the negative half-wave of the voltage VF2 is delayed with respect to the falling edge of the positive half-wave because of the storage time Ts of the transistor Q1, while the rising edge of the positive half-wave is delayed with respect to the rising edge of the negative half-wave because of the storage time Ts of the transistor Q2.

The time required by the transformer T2 to attain its two states of saturation is independent of the load on the outputs, whereby the frequency of the self-oscillation is also independent. The ratio between the times for which the transistors Q1 and Q2 are conducting primarily depends on the time taken by the transformer T2 to reach the two states of saturation; that of the positive quadrant of the hysteresis cycle in the phases shown in FIGS. 5 and 8, and that of the negative quadrant of the hysteresis cycle in the phases shown in FIGS. 6 and 7. That ratio may be varied by returning to a winding Wc a direct current component derived from an error voltage Ve which is produced by comparing a reference voltage with one of the given output voltages, for example a voltage of 5 V. The transformer T2 is thus biased and advances the time of saturation in one direction and delays it in the opposite direction. Such variation in the ratio of the conducting times of the two transistors Q1 and Q2 of the converter permits stabilization of the voltages at the output since it is proportional to the ratio of the on-off times or the transistors Q1 and Q2.

It will be clear therefore that the reaction signal Ve for controlling the output voltage is applied directly to T2 which causes control of the transistors Q1 and Q2 and causes them to self-oscillate, thus also readily achieving the isolation necessary between the primary and secondary circuits of T1.

The secondary windings A1 and A2 of the transformer T1 may be in phase opposition to the winding A0 and, by means of a pair of diodes D3 and D4 (see FIG. 2) which conduct in opposition to the transistor Q1, a converter of flyback type is provided. With the secondary windings A1 and A2 disposed in phase with the primary winding A0 (see FIG. 3), the arrangement provides for forward type conduction in phase with that of the transistor Q1. It is thus clear that in both cases, due to the diodes D3 and D4, the secondary windings A1, A2 of the electric transformer T1 supply output voltages only when current flows in the primary winding A0 in one direction, that is, only during one of the phases of the transformer T1. Since the current flowing in the primary winding A0 in the opposite direction causes no output, it will merely demagnetize the core of the transformer and cannot magnetize said core in the opposite direction. The different arrangement of the outputs does not however affect the control circuits P1 and P2.

I claim:

1. A direct current converter for a switched mode stablized power supply, comprising a power transformer having a primary winding to be supplied with a high voltage trapezoidal direct current wave having a first direction to supply the transformer with a magnetizing energy, a secondary winding for supplying at least one output voltage during one of a pair of operating phases of said transformer, a first control circuit including a first transistor for controlling the supplying of said trapezoidal direct current wave in a first operating phase of said pair, a second control circuit including a capacitor for accumulating part of said magnetizing energy during a second operating phase, a second transistor for causing said capacitor to supply to said primary winding a current due to the accumulated energy and having a direction opposite to said first direction, a diode associated with said second control circuit for causing said capacitor to accumulate the relevant energy, and a control transformer having a primary winding controlled by said power transformer, a pair of oppositely poled secondary windings on said control transformer operative alternately to control said first and second transistors.

2. A converter according to claim 1, including diode means for causing the secondary winding of said power transformer to supply the output voltage during said first operating phase of the power transformer.

3. A converter according to claim 1, including diode means for causing the secondary winding of said power transformer to supply the output voltage during the secondary operating phase of the power transformer.

4. A converter according to claim 1, wherein said capacitor accumulates the energy in a first part of said second phase and is discharged under the control of said second transistor during a second part of the same second phase.

5. A converter according to claim 4, wherein said control transformer alternates the control of said two transistors upon attaining its two states of saturation, said control transformer including an additional winding supplied with an error voltage to alter the ratio between times taken by said control transformer to attain the two opposite states of saturation according to said output voltage.

* * * * *